(12) United States Patent
Hamachi

(10) Patent No.: US 8,934,629 B2
(45) Date of Patent: Jan. 13, 2015

(54) COMMUNICATION APPARATUS, IMAGE INPUT APPARATUS, IMAGE OUTPUT APPARATUS, WIRELESS COMMUNICATION CIRCUIT, METHOD FOR CONTROLLING APPARATUS, AND PROGRAM

(75) Inventor: Toshifumi Hamachi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1120 days.

(21) Appl. No.: 12/511,465

(22) Filed: Jul. 29, 2009

(65) Prior Publication Data

US 2010/0027414 A1 Feb. 4, 2010

(30) Foreign Application Priority Data

Jul. 31, 2008 (JP) ................... 2008-197965

(51) Int. Cl.
- *H04L 9/00* (2006.01)
- *H04W 48/16* (2009.01)
- *H04L 9/32* (2006.01)

(52) U.S. Cl.
CPC ..................... *H04W 48/16* (2013.01)
USPC ........... 380/260; 370/503; 380/270; 380/277; 713/171

(58) Field of Classification Search
None
See application file for complete search history.

(56) References Cited

U.S. PATENT DOCUMENTS

| | | | |
|---|---|---|---|
| 6,839,410 B2 * | 1/2005 | Infosino ..................... 379/88.02 |
| 7,266,687 B2 * | 9/2007 | Sowa et al. .................... 713/163 |
| 7,448,068 B2 * | 11/2008 | Sun et al. .......................... 726/2 |
| 7,486,183 B2 * | 2/2009 | Luebke et al. ................. 340/506 |
| 7,685,071 B2 * | 3/2010 | Terauchi et al. ................ 705/59 |
| 7,856,033 B2 * | 12/2010 | Oksman et al. ................ 370/465 |
| 8,001,080 B2 * | 8/2011 | Gupta et al. ................... 707/617 |
| 8,369,231 B2 * | 2/2013 | Hirose ........................... 370/252 |
| 2003/0154408 A1 * | 8/2003 | Zhu et al. ....................... 713/201 |
| 2006/0246941 A1 * | 11/2006 | Watanabe et al. ........... 455/552.1 |
| 2007/0147318 A1 | 6/2007 | Ross |
| 2007/0190973 A1 * | 8/2007 | Goto et al. ..................... 455/410 |
| 2008/0095057 A1 * | 4/2008 | Zhou .............................. 370/235 |
| 2010/0034120 A1 * | 2/2010 | Nakajima ...................... 370/255 |

FOREIGN PATENT DOCUMENTS

| | | | |
|---|---|---|---|
| CN | 001882128 A | 12/2006 |
| CN | 101069385 A | 11/2007 |
| EP | 1750395 A1 * | 2/2007 | ............. H04L 12/28 |
| EP | 1755281 | 2/2007 |
| JP | 10-336264 A | 12/1998 |
| JP | 2006-101416 A | 4/2006 |
| JP | 2006-311137 A | 11/2006 |
| JP | 2006-332788 | 12/2006 |
| WO | 2006/036005 A1 | 4/2006 |
| WO | WO2006/036005 | 4/2006 |
| WO | WO2006/048725 A2 | 5/2006 |

* cited by examiner

*Primary Examiner* — Jung Kim
*Assistant Examiner* — James J Wilcox
(74) *Attorney, Agent, or Firm* — Canon U.S.A., Inc. IP Division

(57) ABSTRACT

After connection to another communication apparatus using the first communication-parameter set fails, and thereafter, connection to the other communication apparatus using the second communication-parameter set is successfully established, the connection to the other communication apparatus using the first communication-parameter set is attempted again.

21 Claims, 11 Drawing Sheets

| AUTHENTICATION METHOD | ENCRYPTION METHOD |
|---|---|
| WPA2-Enterprise | AES |
| WPA2-Enterprise | TKIP |
| WPA-Enterprise | AES |
| WPA-Enterprise | TKIP |
| WPA2-PSK | AES |
| WPA2-PSK | TKIP |
| WPA-PSK | AES |
| WPA-PSK | TKIP |
| Shard-WEP | WEP |
| OPEN | WEP |
| OPEN | NONE |

OBTAINED COMMUNICATION PARAMETERS

| | FIRST | SECOND | THIRD | FOURTH |
|---|---|---|---|---|
| NW IDENTIFIER | WLAN | WLAN | WLAN2 | WLAN |
| AUTHENTICATION METHOD | WPA2-PSK | WPA-PSK | WPA-PSK | OPEN |
| ENCRYPTION METHOD | AES | TKIP | TKIP | WEP |

COMMUNICATION PARAMETERS AFTER DISCRIMINATION

| | FIRST | SECOND | THIRD |
|---|---|---|---|
| NW IDENTIFIER | WLAN | WLAN | WLAN |
| AUTHENTICATION METHOD | WPA2-PSK | WPA-PSK | OPEN |
| ENCRYPTION METHOD | AES | TKIP | WEP |

FIG. 8A

OBTAINED COMMUNICATION PARAMETERS

| | FIRST | SECOND | THIRD | FOURTH |
|---|---|---|---|---|
| NW IDENTIFIER | WLAN | WLAN | WLAN | WLAN |
| AUTHENTICATION METHOD | WPA-PSK | WPA2-PSK | OPEN | OPEN |
| ENCRYPTION METHOD | TKIP | AES | NONE | WEP |

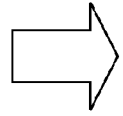

FIG. 8B

COMMUNICATION PARAMETERS AFTER SORTING

| | FIRST | SECOND | THIRD | FOURTH |
|---|---|---|---|---|
| NW IDENTIFIER | WLAN | WLAN | WLAN | WLAN |
| AUTHENTICATION METHOD | WPA2-PSK | WPA-PSK | OPEN | OPEN |
| ENCRYPTION METHOD | AES | TKIP | WEP | NONE |

FIG. 9A

| STRENGTH | ENCRYPTION METHOD |
|---|---|
| 1 | AES |
| 2 | TKIP |
| 3 | WEP |
| 4 | NONE |

FIG. 9B

| SPEED | COMMUNICATION STANDARD |
|---|---|
| 1 | 802.11n |
| 2 | 802.11a |
| 3 | 802.11g |
| 4 | 802.11b |

COMMUNICATION APPARATUS, IMAGE INPUT APPARATUS, IMAGE OUTPUT APPARATUS, WIRELESS COMMUNICATION CIRCUIT, METHOD FOR CONTROLLING APPARATUS, AND PROGRAM

BACKGROUND OF THE INVENTION

1. Field of the Invention

The present invention relates to a technique of connecting communication apparatuses with each other.

2. Description of the Related Art

In wireless communications complying with IEEE802.11 standard, various communication parameters should be set before performing communications. Note that "IEEE" stands for "The Institute of Electrical and Electronics Engineers, Inc."

Examples of the parameters to be set include an SSID serving as a network identifier, an encryption method, an encryption key, an authentication method, and an authentication key. Manual inputs thereof are considerably troublesome for users. Note that the "SSID" stands for Service Set Identifier.

Therefore, a method for automatically setting the communication parameters to wireless apparatuses with ease has been proposed. "Wi-Fi CERTIFIED™ for Wi-Fi Protected Setup: Easing the User Experience for Home and Small Office Wi-Fi® Networks, http://www.wi-fi.org/wp/wifi-protected-setup" discloses WPS which is standardized by Wi-Fi Alliance as an example of the method for automatically setting the communication parameters. Note that the "WPS" stands for Wi-Fi Protected Setup.

In the method for automatically setting the WPS, the communication parameters are supplied from one apparatus to another in accordance with predetermined procedures and messages, and are automatically set.

The method for automatically setting the communication parameters includes a method for inputting an authentication code in one of the apparatuses by a user (hereinafter referred to as an "authentication code method") and a method without using the authentication code (hereinafter referred to as a "non-authentication code method").

In the authentication code method, the authentication code is shared by the apparatuses so that the apparatuses authenticate each other, and if the authentication is successfully performed, setting processing is performed between the apparatuses. By performing the authentication operation, one of the apparatuses securely transmits communication parameters to another.

In the non-authentication code method, when a communication apparatus in which automatic setting of the communication parameters thereof is activated is detected, the communication parameters are automatically transmitted to the communication apparatus. An example of the non-authentication code method includes a method for starting setting processing of a first apparatus in response to a press of a setting-start button disposed on the first apparatus, and performing automatic setting between the first apparatus and a second apparatus in which setting processing thereof is similarly started during the setting processing of the first apparatus. Although the non-authentication code method is inferior to the authentication code method in security, it saves the user the trouble of inputting the authentication code. That is, operability is improved.

As described above, in the automatic setting of communication parameters, a plurality of communication-parameter sets may be simultaneously transmitted to a wireless apparatus. However, there is no assurance that all the communication-parameter sets are used for connection between the wireless apparatuses.

Furthermore, some general base-station apparatuses each include devices used to reconstruct networks after automatic settings are performed. Such apparatuses do not accept connection requests from the wireless apparatuses while reconstructing the networks. Therefore, while the base-station apparatuses are reconstructing the networks, processing of connecting the wireless apparatuses fails.

Furthermore, since different base-station apparatuses require different reconstruction times, it is difficult to determine whether connection failed due to inappropriate communication parameters or due to insufficient preparation of the base-station apparatus.

Therefore, a method for repeatedly attempting the connection processing with an identical communication parameter set or a method for attempting the connection processing by successively switching communication-parameter sets from one to another may be used.

SUMMARY OF THE INVENTION

However, even when connection processing is repeatedly attempted with an identical parameter, if an inappropriate communication-parameter set is used, wireless apparatuses are not connected to each other. Furthermore, when the connection processing is attempted by successively switching communication-parameter sets from one to another, it is possible that, among the plurality of communication-parameter sets, a parameter set having a low security level or a parameter set having a low communication speed is used for the communication processing.

The present invention is provided to address a problem which occurs when communication apparatuses perform data communication with each other using one of a plurality of communication-parameter sets.

According to an aspect of the present invention, there is provided a communication apparatus including a receiving unit configured to receive a plurality of communication-parameter sets, which are transmitted to the communication apparatus in response to a request for acquiring communication-parameter sets, a connecting unit configured to connect the communication apparatus to another communication apparatus using one of the plurality of communication-parameter sets received by the receiving unit, and a requesting unit configured to transmit, when the connection to the other communication apparatus using a communication-parameter set has been successfully established, a request for connecting to the other apparatus using another communication-parameter set, from among the received plurality of communication-parameter sets.

According to another aspect of the present invention, there is provided method for controlling a communication apparatus, including receiving a plurality of communication-parameter sets which are transmitted in response to a request for acquiring the communication-parameter sets, connecting the communication apparatus to another communication apparatus using one of the plurality of received communication-parameter sets, and transmitting, when the connection to the other communication apparatus using a communication-parameter set is successfully established, a request for connecting to the other apparatus using the other communication-parameter set from among the plurality of received communication-parameter sets.

According to still another aspect of the present invention, there is provided a recording medium which stores a program which makes a computer function as the communication apparatus.

Further features of the present invention will become apparent from the following description of exemplary embodiments with reference to the attached drawings.

BRIEF DESCRIPTION OF THE DRAWINGS

FIG. 8A is a table of obtained communication parameters, and FIG. 8B is a table of communication parameters after sorting according to the second exemplary embodiment.

FIG. 9A is a diagram illustrating levels of encryption methods, and FIG. 9B is a diagram illustrating speed levels of communication standards according to the second exemplary embodiment.

DESCRIPTION OF THE EXEMPLARY EMBODIMENTS

A communication apparatus according to a first exemplary embodiment will now be described in detail with reference to the accompanying drawings. Hereinafter, a wireless LAN (Local Area Network) system complying with IEEE802.11 series is employed as an example. However, a wireless LAN system other than one complying with IEEE802.11 series may be employed.

Figures 1A, 1B:
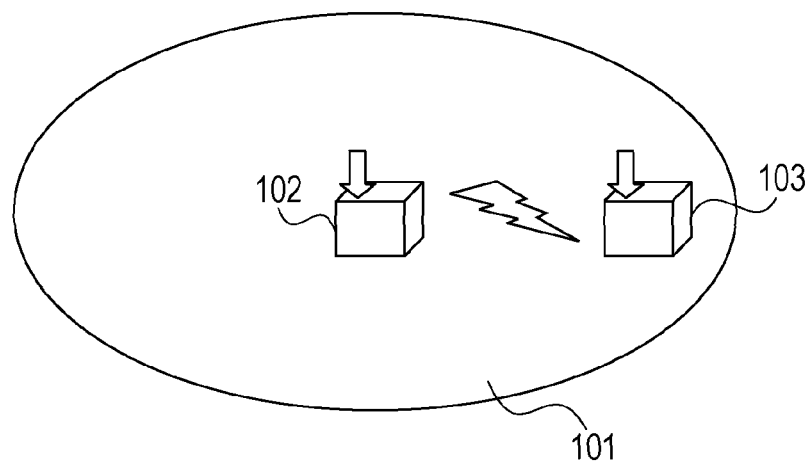
FIG. 1A is a diagram illustrating a network configuration and FIG. 1B is a table listing combinations of an authentication method and an encryption method according to a first exemplary embodiment.

FIG. 1A is a diagram illustrating a configuration of a wireless LAN system including a base station 102 for a wireless communication and a communication apparatus 103 which performs the wireless communication through the base station 102, according to this exemplary embodiment.

An identifier "WLAN" is assigned as a network identifier to a wireless network 101 of this exemplary embodiment. In this exemplary embodiment, although an SSID (Service Set Identifier) is used as the network identifier, any other network identifier may be used, such as an ESSID (Extended SSID).

The wireless network 101 includes the base station 102 and the communication apparatus 103. The base station 102 stores information on a configuration of the wireless network 101. In this exemplary embodiment, the base station 102 also serves as a communication-parameter supplying apparatus which supplies a plurality of communication-parameter sets to the communication apparatus 103. Note that each of the communication-parameter sets corresponds to a combination of communication parameters, such as a network identifier, an encryption method, an authentication method, an encryption key, and a communication standard (IEEE802.11g or IEEE802.11n, for example), which are to be set through automatic setting processing. The communication apparatus 103 is connected to the base station 102 using a combination of an authentication method and an encryption method as shown in FIG. 1B. Note that connections using some of the combinations shown in FIG. 1B may be banned by a user's setting. Combinations of authentication methods and encryption methods for the plurality of parameters to be supplied to the communication apparatus 103 are selected from the combinations shown in FIG. 1B.

Although the base station 102 supplies the communication parameters in this exemplary embodiment, another communication apparatus connected to the base station 102 by a wired communication connection or a wireless communication connection may supply the communication parameters through the base station 102. In this case, certain communication parameters which are not supplied from the base station 102 since the base station 102 is not compatible with the certain communication parameters or since the base station 102 does not have the certain communication parameters set thereto may be supplied from another communication apparatus.

Note that "WPA" in FIG. 1B stands for "Wi-Fi Protected Access" standardized by the Wi-Fi Alliance, "PSK" stands for "Pre-Shared Key". Furthermore, "TKIP" stands for "Temporal Key Integrity Protocol", "AES" stands for "Advanced Encryption Standard", and "WEP" stands for "Wired Equivalent Privacy".

Alternatively, another communication apparatus may directly supply the communication parameters without passing them through the base station 102.

The communication apparatus 103 performs wireless communication through the base station 102. Examples of the communication apparatus 103 include a printer, a copier, a digital still camera, a scanner, a television set, a computer, a communication adapter connected to these devices, a wireless communication circuit incorporated into these devices, and a wireless communication circuit detachable from these devices. In this exemplary embodiment, the communication apparatus 103 is connected to the wireless network 101 constituted by the base station 102, and performs automatic setting of the communication parameters.

A configuration of the communication apparatus 103 according to this exemplary embodiment will now be described.

Figure 2:
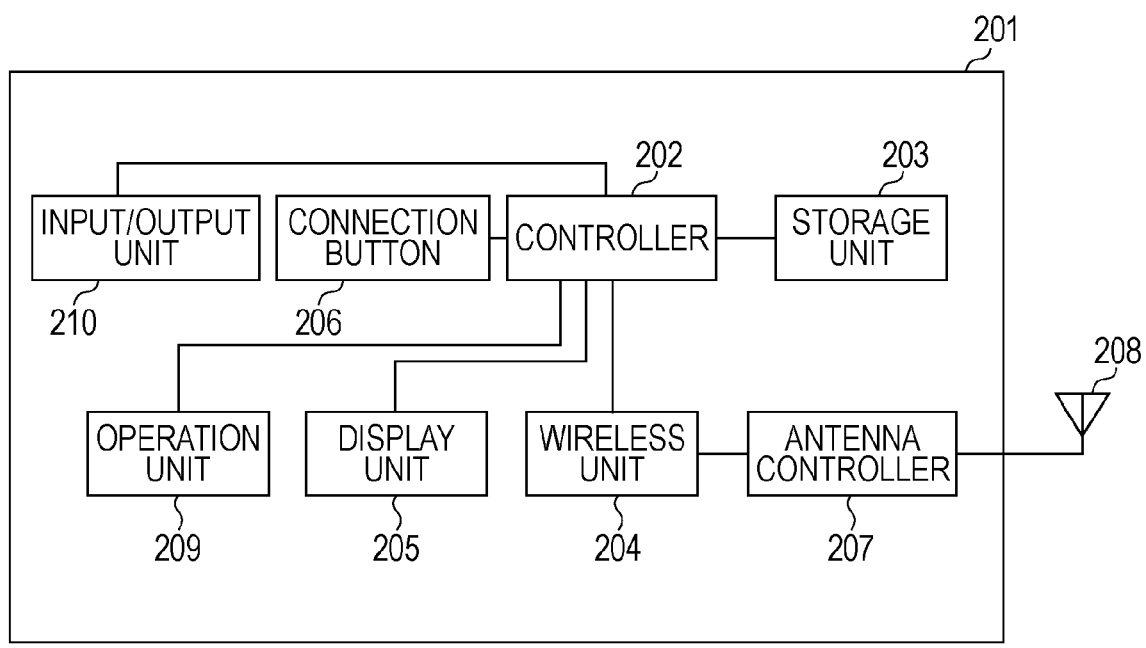
FIG. 2 is a block diagram illustrating a configuration of a communication apparatus according to the first exemplary embodiment.

FIG. 2 is a block diagram illustrating an example of a configuration of the communication apparatus 103.

An entire system 201 of the communication apparatus 103 includes a controller 202, a storage unit 203, and a wireless unit 204. The controller 202 controls the entire system 201 by executing control programs stored in the storage unit 203, and further controls setting of the communication parameters in communications with other apparatuses. The storage unit 203 stores the control programs to be executed by the controller 202 and various information items such as the communication parameters. Operations described below are executed in response to executions of the control programs stored in the storage unit 203 by the controller 202. The wireless unit 204 performs a wireless communication.

The entire system 201 further includes a display unit 205 and a connection button 206. The display unit 205 performs various display operations and has a function of outputting visually recognizable information, such as a function of a display (an LCD (Liquid Crystal Display)) or a function of an LED (Light Emitting Diode), and a function of outputting sounds, such as a speaker function. The connection button 206 is used by a user to instruct establishment of connection to the wireless network 101. When the user operates the connection button 206, processing for connecting to the wireless network 101 using the communication parameters which have been stored in the storage unit 203, or processing for connecting to the wireless network 101 using the communication parameters which have been supplied from the base station 102 serving as the communication-parameter supplying source is performed.

The entire system 201 further includes an antenna controller 207, an antenna 208, an operation unit 209, and an input/output unit 210. When detecting an operation of the connection button 206 performed by the user, the controller 202 performs a certain operation described below. The antenna controller 207 controls the antenna 208. The user operates the operation unit 209 so as to instruct processing for disconnecting from the wireless network 101. The input/output unit 210 is used for input and output of data through the wireless unit 204. The communication apparatus 103 functions as an image inputting apparatus such as a digital still camera. In this case, the input/output unit 210 functions as an input unit which captures an image. The image input from the input unit 210 is stored in the storage unit 203. When the user operates the connection button 206 so that network-connection processing is performed, the input/output unit 210 supplies the stored image through the wireless unit 204 to the base station 102. Furthermore, the communication apparatus 103 serves as an image outputting apparatus such as a printer. In this case, the input/output unit 210 functions as an output unit which prints or displays an image. In the case where the input/output unit 210 functions as the output unit, when the user operates the connection button 206 so that the network-connection processing is performed, the input/output unit 210 prints or displays an image supplied from the base station 102 through the wireless unit 204.

Figure 3:
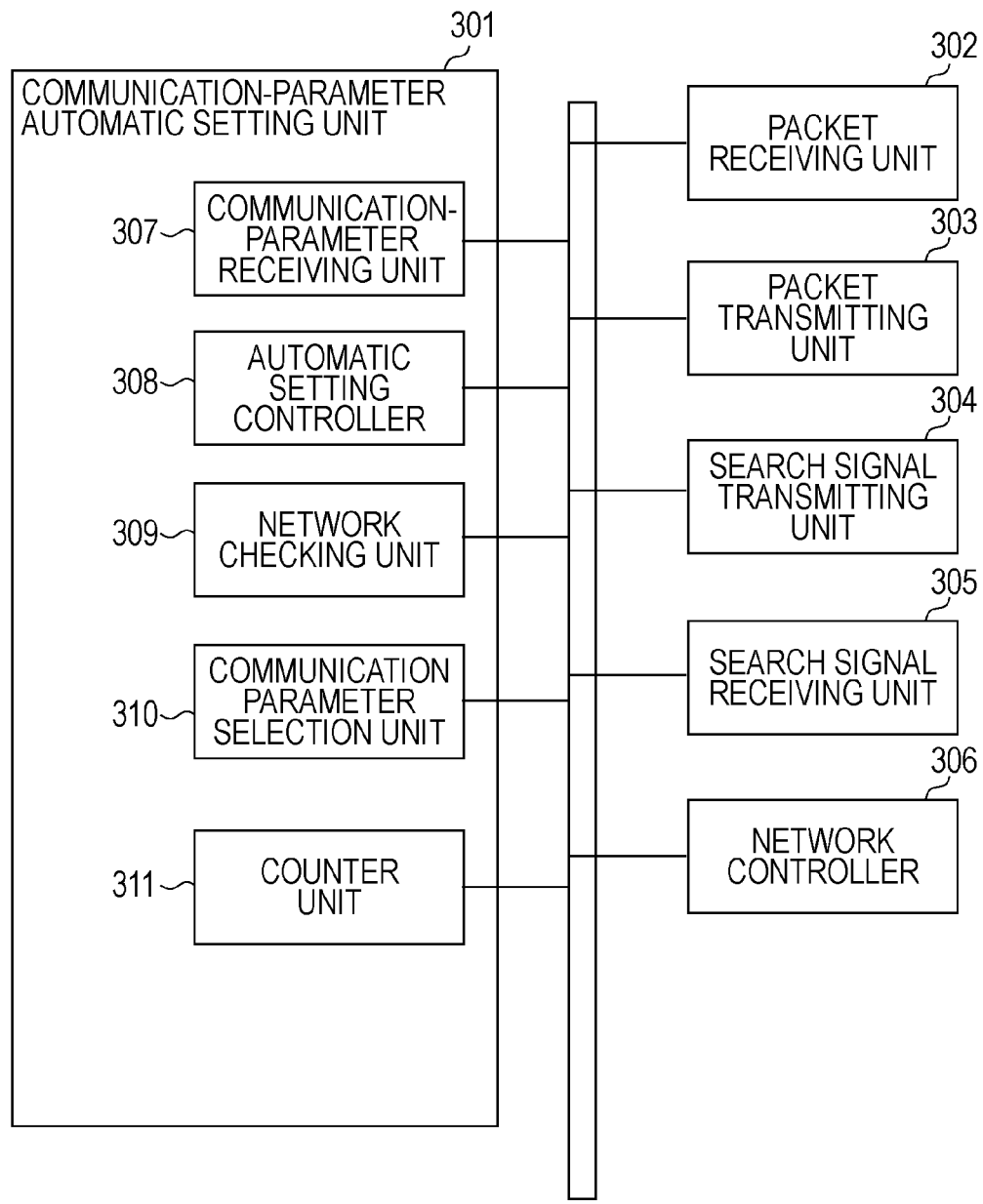
FIG. 3 is a block diagram illustrating software functions according to the first exemplary embodiment.

FIG. 3 is a block diagram illustrating an example of a configuration of software function blocks executed by the controller 202.

A communication-parameter automatic-setting unit 301 includes function blocks 307 to 311, which will be described hereinafter, and performs automatic setting of the communication parameters.

A packet receiving unit 302 receives packets used in communications. A packet transmitting unit 303 transmits packets used in communications. A search-signal transmitting unit 304 transmits apparatus-search signals such as probe requests, and performs control operations regarding the transmission. Note that the probe requests may be referred to as network-search signals used to search for a desired network. The search-signal transmitting unit 304 further transmits probe responses which are response signals to the received probe requests.

A search-signal receiving unit 305 receives beacons and the apparatus-search signals such as the probe requests supplied from another apparatus, and performs control operations regarding the reception. The search-signal receiving unit 305 also receives probe responses.

A network controller 306 controls network connection. In response to an instruction issued by the network controller 306, the communication apparatus 103 is connected to or disconnected from the wireless network 101 (or the base station 102).

A communication-parameter receiving unit 307 receives the communication parameters from the base station 102 serving as the communication-parameter supplying apparatus. An automatic-setting controller 308 controls various protocols when the communication parameters are automatically set. Specifically, the automatic-setting controller 308 performs automatic setting of the communication parameters required for the wireless communication, such as the SSID serving as the network identifier (hereinafter referred to as a "NW identifier" as needed), the encryption method, the encryption key, the authentication method, and the authentication key. In this exemplary embodiment, two methods, i.e., an authentication code method and a non-authentication code method, are included in the communication-parameter automatic setting method.

A network checking unit 309 checks whether a network specified by the communication parameters exists. The network checking unit 309 checks whether the network specified by the communication parameters is recognized in accordance with a search signal transmitted from the search-signal transmitting unit 304 and a response signal received by the search-signal receiving unit 305. A communication-parameter selection unit 310 selects a communication-parameter set used for a connection from among a plurality of obtained communication-parameter sets. A counter unit 311 prevents loss of control caused by an infinite loop. Note that, in this exemplary embodiment, loss of control is prevented by incrementing a value of the counter unit 311. However, loss of control may be prevented by measuring a period of time using a timer so that a timeout occurs when a predetermined period of time has elapsed.

Note that all the function blocks shown in FIGS. 2 and 3 are associated with one another in terms of software or hardware. The function blocks described above are merely examples, and, among the function blocks, a plurality of function blocks may be configured as a single function block, or one of the function blocks may be further divided into a plurality of function blocks.

Figure 4:
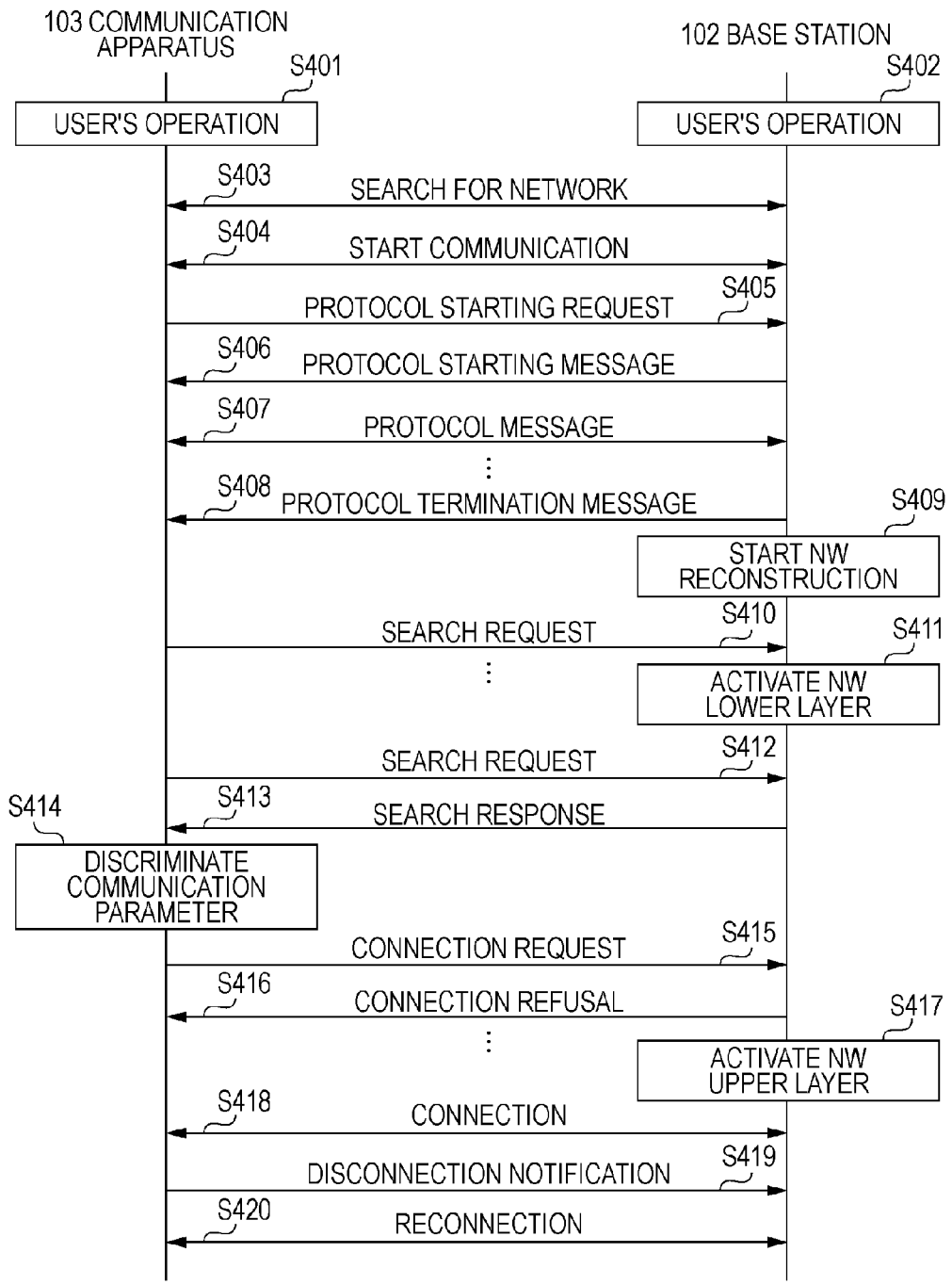
FIG. 4 is a diagram illustrating a processing sequence between the communication apparatus and a base station according to the first exemplary embodiment.
Figures 5A, 5B:
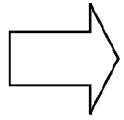
FIG. 5A is a table of obtained communication parameters.
FIG. 5B is a table of communication parameters after discrimination according to the first exemplary embodiment.

FIG. 4 is a diagram illustrating a processing sequence performed between the communication apparatus 103 and the base station 102. In this exemplary embodiment, the communication apparatus 103 obtains a plurality of communication-parameter sets from the base station 102 by automatic setting, and is connected to the wireless network 101. The communication apparatus 103 obtains four communication-parameter sets as shown in FIG. 5A. The base station 102 transmits the communication-parameter sets in descending order of security level.

In FIG. 5A, a first communication-parameter set has a network identifier "WLAN", an authentication method "WPA2-PSK", and an encryption method "AES". A second communication-parameter set has a network identifier "WLAN", an authentication method "WPA-PSK", and an encryption method "TKIP". A third communication-parameter set has a network identifier "WLAN2", an authentication method "WPA-PSK", and an encryption method "TKIP". A fourth communication-parameter set has a network identifier "WLAN", an authentication method "OPEN", and an encryption method "WEP".

In step S401, the communication apparatus 103 activates a communication-parameter automatic-setting application in response to a user's operation of the connection button 206 or an instruction issued by the controller 202 which controls the communication apparatus 103. Similarly, in step S402, the base station 102 activates a communication-parameter automatic-setting application in response to an instruction issued by a control software application which controls the base station 102. The base station 102 constructs a network employing a dedicated SSID used for communication-parameter automatic setting.

The communication apparatus 103 including the communication-parameter automatic-setting application which has been activated searches for wireless networks in step S403. Then, the communication apparatus 103 automatically or manually selects one of the obtained wireless networks. In this exemplary embodiment, a wireless network which includes the base station 102 and which is used for the communication-parameter automatic setting is selected.

In step S404, the communication apparatus 103 starts communication with the base station 102. However, at this point in time, an encryption key and an authentication key which are to be shared by the communication apparatus 103 and the base station 102 have not yet been set. Therefore, the communication apparatus 103 and the base station 102 communicate with each other only using a specific signal, but are not allowed to perform normal data communication with each other using encryption and authentication. Examples of the specific signal include beacons issued by the base station 102, notification signals, such as probe requests, issued by the base station 102 or the communication apparatus 103, and messages about protocols for the automatic setting.

After starting the communication with the base station 102, the communication apparatus 103 transmits a protocol-starting request specified by a protocol for the automatic setting, such as the WPS, to the base station 102 in step S405.

When receiving the protocol-starting request, the base station 102 recognizes that the communication apparatus 103 has started the communication-parameter automatic setting, and transmits a message representing a protocol start to the communication apparatus 103 in step S406. In step S407, the communication apparatus 103 and the base station 102 exchanges protocol messages in accordance with the protocol of the communication-parameter automatic setting. Note that, in this exchange of the protocol messages, the base station 102 transmits the four communication-parameter sets shown in FIG. 5A to the communication apparatus 103. In addition to the communication parameters shown in FIG. 5A, other communication parameters, such as an encryption key and an authentication key, required for the wireless communication are also transmitted from the base station 102.

After supplying the communication parameters to the communication apparatus 103 using the protocol for the automatic setting, the base station 102 transmits a protocol termination message to the communication apparatus 103 in step S408. After transmitting the protocol termination message, the base station 102 of this exemplary embodiment starts processing for reconstructing the wireless network 101 in step S409. The reconstruction processing is performed to switch the network employing the dedicated SSID used for the communication-parameter automatic setting to a network employing an SSID used for a normal data communication. Specifically, a lower layer of the network including an MAC layer complying with the 802.11 series and an upper layer of the network including an authenticator of a WPA are rebooted.

The base station 102 is not allowed to response to a search request, for example, issued by the communication apparatus 103 until the rebooting of the lower layer is completed in step S411. Furthermore, the base station 102 is not allowed to respond to a search request issued by the communication apparatus 103 until the rebooting of the upper and lower layers is completed in step S417.

On the other hand, after obtaining the four communication-parameter sets shown in FIG. 5A and receiving the protocol termination message, the communication apparatus 103 transmits a search request in step S410. However, at this point in time, the base station 102 has not yet completed the rebooting of the lower layer, and therefore, the base station 102 does not transmit a search response. Accordingly, since the communication apparatus 103 has not detected the wireless network 101, the communication apparatus 103 transmits a search request again in step S412. When the search request is transmitted again, the base station 102 has completed the rebooting of the lower layer in step S411. Therefore, in step S413, the base station 102 transmits a response to the search request issued by the communication apparatus 103. In order to receive the search response, the communication apparatus 103 detects the wireless network 101 having the network identifier "WLAN". In accordance with a result of the search response, the communication apparatus 103 performs discrimination processing on the obtained communication parameter sets in step S414. Here, communication parameter sets having the network identifier "WLAN" detected in step S413 are determined. In accordance with results of the discrimination, communication-parameter sets shown in FIG. 5B are selected.

Then, the communication apparatus 103 determines a first communication-parameter set shown in FIG. 5B obtained after the discrimination as a parameter set to be used for the wireless communication, and transmits a connection request to the base station 102 in step S415. However, since the rebooting of the upper layer has not been completed, the base station 102 transmits a connection refusal to the communication apparatus 103 in step S416.

Thereafter, the base station 102 completes the rebooting of the upper layer in step S417. Since the rebooting of the upper layer has been completed, the base station 102 is ready to be connected to the communication apparatus 103 using any one of the first to third communication-parameter sets obtained after the discrimination. However, since the connection between the communication apparatus 103 and the base station 102 using the first communication-parameter set failed, a second communication-parameter set shown in FIG. 5B obtained after the discrimination is determined as the parameter set to be used for the wireless communication. Note that the communication-parameter set is changed as described above, since it is difficult to determine whether the connection between the communication apparatus 103 and the base station 102 failed due to an inappropriate communication-character set or due to insufficient preparation of the base station 102. Note that the inappropriate communication-parameter set means a communication-parameter set in which the user has performed setting thereof in such a manner that the base station 102 does not allow a communication using the communication-parameter set.

Thereafter, the communication apparatus 103 transmits a connection request to the base station 102 again. Since the base station 102 has completed the activation of the upper layer, the base station 102 performs processing in response to the connection request, exchanges messages with the communication apparatus 103, and thereafter, terminates the connection in step S418. As a result of these operations, the communication apparatus 103 determines that the base station 102 has completed the rebooting and is brought into a connection-available state.

Since the connection is successfully established using the second communication-parameter set, establishing of a connection using the first communication-parameter set which has the highest priority level is attempted again. Note that the priority levels are assigned to the obtained communication-parameter sets in order of obtainment. In this exemplary embodiment, since the base station 102 transmits the communication parameter sets in descending order of security level, the higher security levels are assigned to the communication-parameter sets in order of obtainment.

In order to attempt the connection using the first communication-parameter set again, the connection between the communication apparatus 103 and the base station 102 should be cancelled (or disconnected). Therefore, a disconnection notification is transmitted to the base station 102 in step S419. Thereafter, the first communication-parameter set is determined as the parameter set to be used for the wireless communication. After completion of the setting, the communication apparatus 103 starts connection processing, and transmits a connection request to the base station 102. The base station 102 performs processing in response to the connection request, exchanges messages with the communication apparatus 103, and thereafter, terminates the connection in step S420. When the communication apparatus 103 is successfully connected to the base station 102 in this way, the communication apparatus 103 is ready to perform normal data communication with the base station 102 using encryption and authentication.

As described above, the communication apparatus 103 is once connected to the base station 102, and recognizes that the base station 102 has completed the rebooting and is in the connection-available state with the communication apparatus 103. Thereafter, the communication apparatus 103 is connected to the base station 102 again using a communication parameter of a higher security level. In this way, a communication using a communication parameter of a high security level is achieved.

Figure 6:
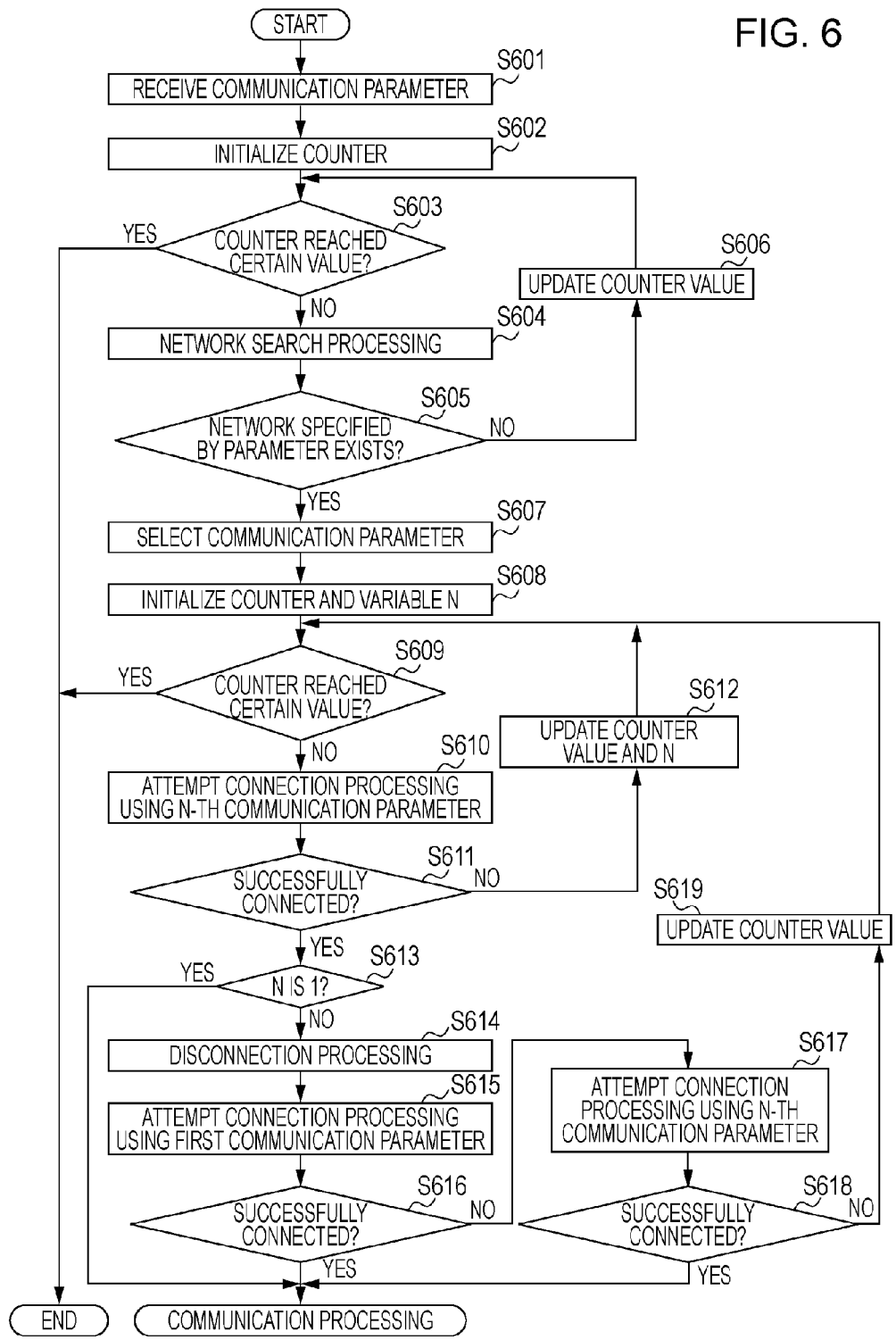
FIG. 6 is a flowchart illustrating an operation of the communication apparatus according to the first exemplary embodiment.

Next, a control operation performed by the communication apparatus 103 when the communication apparatus 103 receives the plurality of communication-parameter sets from the base station 102 by the communication-parameter automatic setting will be described with reference to FIG. 6. FIG. 6 is a flowchart illustrating the control operation performed when a control program stored in the storage unit 203 is executed by the controller 202.

In step S601, the communication-parameter receiving unit 307 receives the communication parameter sets shown in FIG. 5A in accordance with an instruction issued by the controller 202. The communication parameter sets are received in order of obtainment.

In step S602, the controller 202 activates the counter unit 311 and sets an initial value ("0" in this exemplary embodiment) to the counter unit 311. In step S603, the controller 202 determines whether a value which has been set in the counter unit 311 has reached a predetermined value ("15" in this exemplary embodiment). When the determination is affirmative in step S603, the processing is terminated. On the other hand, when the determination is negative in step S603, the process proceeds to step S604. By this, loss of control due to an infinite loop is prevented. Note that in this exemplary embodiment, the loss of control is prevented by incrementing a value of the counter unit 311. However, the loss of control may be prevented by measuring a period of time using a timer so that a timeout occurs when a predetermined period of time has elapsed.

In step S604, in accordance with an instruction issued by the controller 202, the search-signal transmitting unit 304 and the search-signal receiving unit 305 perform processing for searching for networks in an ambient area, and the process proceeds to step S605.

In step S605, in accordance with an instruction issued by the controller 202, the network controller 306 determines whether networks corresponding to network identifiers specified by obtained communication-parameter sets as a result of the search processing performed in step S604 are detected in the ambient area. Here, the network controller 306 determines whether networks having network identifiers "WLAN" or "WLAN2" are detected in the ambient area. It is assumed that the wireless network 101 having the network identifier "WLAN" is detected. When the network controller 306 detected the networks specified by the obtained communication-parameter sets, the process proceeds to step S607. On the other hand, when the network controller 306 determined that the networks specified by the obtained communication-parameter sets are not included in the ambient area, the process proceeds to step S606 where the controller 202 increments the value set in the counter unit 311 by one. Then, the process returns to step S603.

In step S607, the communication-parameter selection unit 310 selects communication-parameter sets having network identifiers the same as that of the detected network. Here, the communication-parameter selection unit 310 selects communication-parameter sets corresponding to the network identifier "WLAN". As a result of the determination, the communication-parameter sets shown in FIG. 5B are selected. The selected communication-parameter sets are numbered as shown in FIG. 5B. After the selection, the process proceeds to step S608.

In step S608, the controller 202 initializes the value set in the counter unit 311 (to 0 in this exemplary embodiment) and initializes a value of a variable N (to 1 in this exemplary embodiment). The variable N denotes a value used to identify the communication-parameter sets obtained from the base station 102. The maximum number of N corresponds to the number of selected communication-parameter sets.

In step S609, the controller 202 determines whether the value set in the counter unit 311 has reached a predetermined value (30 in this exemplary embodiment). Note that the predetermined value may be changed in accordance with the number of communication-parameter sets selected in step S607. In this exemplary embodiment, three communication-parameter sets are selected in step S607, and a connection using each of the communication-parameter sets is attempted ten times. Accordingly, the predetermined value is determined to 30. When the determination is affirmative in step S609, the processing is terminated. On the other hand, when the determination is negative in step S609, the process proceeds to step S610.

In step S610, in accordance with an instruction issued by the controller 202, the network controller 306 attempts a connection to the base station 102 using the N-th communication-parameter set. The connection is established when the communication apparatus 103 is authenticated by the base station 102 and associated with the base station 102 on the basis of IEEE802.11 series so that the base station 102 and the communication apparatus 103 perform normal communication.

In step S611, in accordance with an instruction issued by the controller 202, the network controller 306 determines whether the connection of step S610 is successfully established. When the determination is negative in step S611, the process proceeds to step S612 where the controller 202 updates the variable N. Note the term "update" means that the variable N is incremented by one. Note that the variable N may be updated by a random number selected from one to the maximum number of the variable N. The controller 202 increments the value set in the counter unit 311 by one. After the variable N and the value of the counter unit 311 are updated, the process returns to step S609. In this way, the controller 202 attempts the connection to the base station 102 by switching the communication-parameter sets from one to another.

On the other hand, when the determination is affirmative in step S611, the process proceeds to step S613. When the connection is successfully established, the communication apparatus 103 recognizes that the base station 102 has completed the rebooting and is connectable to the communication apparatus 103.

Here, it is assumed that the operations from step S609 to step S612 are repeatedly performed, and when the variable N is equal to 3, it is determined that the connection is successfully established.

In step S613, the controller 202 determines whether the variable N is 1, that is, whether the connection is successfully performed using the first communication-parameter set. The base station 102 has assigned the highest security level to the first communication-parameter set. Therefore, when the variable N is 1, the communication apparatus 103 and the base station 102 perform normal communication using the communication-parameter set having the highest security level. Accordingly, the communication-parameter set having the highest security level is used for the communication.

On the other hand, when it is determined that the variable N is not 1 in step S613, the process proceeds to step S614. Here, since the variable N is 3, the process proceeds to step S614.

In step S614, in accordance with an instruction issued by the controller 202, the network controller 306 cancels the connection established in step S610. The cancel of the connection should be performed so that a connection between the communication apparatus 103 and the base station 102 using the first communication-parameter set having the highest security level is to be attempted again. After completion of the cancel of the connection, the process proceeds to step S615.

In step S615, in accordance with the instruction issued by the controller 202, the network controller 306 attempts to connect the communication apparatus 103 to the base station 102 using the first communication-parameter set.

In step S616, in accordance with the instruction issued by the controller 202, the network controller 306 determines whether the connection attempted in step S615 is successfully established. When the determination is affirmative in step S616, the communication apparatus 103 is communicates with the base station 102 using the first communication-parameter set. On the other hand, when the determination is negative in step S617, the process proceeds to step S617.

In step S617, in accordance with the instruction issued by the controller 202, the network controller 306 attempts to connect the communication apparatus 103 to the base station 102 using the N-th communication-parameter set (here, the third communication-parameter set) which had been used in step S610 when the connection is successfully established.

When it is determined that the connection using the first communication-parameter set is successfully established, the first communication-parameter set is used for the communication processing. On the other hand, when it is determined that the connection using the first communication-parameter set failed, the communication-parameter set is immediately switched to the N-th communication-parameter set (the third communication-parameter set in this exemplary embodiment) which had been used when the connection is successfully established. Accordingly, in a case where the communication with a high security level is attempted, even when the attempt failed, a period of time required for the communication processing is reduced. Accordingly, user operability is improved.

In step S618, in accordance with an instruction issued by the controller 202, the network controller 306 determines whether the connection attempted in step S617 is successfully established. When the determination is affirmative in step S618, the communication processing is performed using the N-th communication-parameter set (the third communication-parameter set in this exemplary embodiment). On the other hand, when the determination is negative in step S618, the process proceeds to step S619. In step S619, the controller 202 increments the value set in the counter unit 311 by one, and the process returns to step S609.

According to the first exemplary embodiment, when the plurality of communication-parameter sets are obtained by the communication-parameter automatic setting, the communication apparatus 103 is once connected to the base station 102. Then, after it is determined that the base station 102 is in a connection-available state, it is determined that whether a connection using the first communication-parameter set, among the obtained plurality of communication-parameter sets, which has the highest priority level can be established. Note that priority levels are assigned to the plurality of communication-parameter sets obtained from the base station 102 in order of obtainment. In this exemplary embodiment, the communication-parameter sets are supplied from the base station 102 in descending order of security level. Therefore, among the communication-parameter sets, a communication-parameter set having the highest security level is preferentially selected for the wireless communication, and this is effective to the base station 102 in which the highest security level is assigned to the first communication-parameter set. Furthermore, when the connection using the first communication-parameter set fails due to an environment or a capability of the communication apparatus 103, the N-th communication-parameter set which had been used when the connection was successfully established is used for the communication. Accordingly, connectivity is ensured. Furthermore, since the N-th communication-parameter set which was used when the connection was successfully established is immediately used for the connection, a period of time required before the communication processing is performed is reduced. Accordingly, user operability is improved. Note that the environment includes the communication-parameter sets set in the base station 102 and ambient electric-wave environments. Furthermore, the capability includes an authentication method, an encryption method, a communication standard (IEEE802.11g and IEEE802.11n, for example), and a frequency (channel and a band, for example) which are usable by the communication apparatus 103.

Furthermore, in step S617 of this exemplary embodiment, the controller 202 may attempt the connection by successively switching the selected communication-parameter sets from one to another starting from the second communication-parameter set. In this case, if the communication-parameter sets are supplied from the base station 102 in descending order of security level, a communication-parameter set, among the communication-parameter sets which can be used in the communication, which has the highest security level is used for the communication.

Next, a second exemplary embodiment according to the present invention will be described with reference to the accompanying drawings. Note that a configuration of a network system and a configuration of a communication apparatus 103 of the second exemplary embodiment are the same as those of the first exemplary embodiment described with reference to FIGS. 1 to 3, and therefore, descriptions thereof are omitted.

In this exemplary embodiment, as with the first exemplary embodiment, a case where the communication apparatus 103 is connected to a wireless network 101 constituted by a base station 102, and performs communication-parameter automatic setting will be described. In this exemplary embodiment, unlike the first exemplary embodiment, it is not necessarily the case that, among communication-parameter sets supplied from the base station 102, the highest security level is assigned to a first communication-parameter set.

Figure 7:
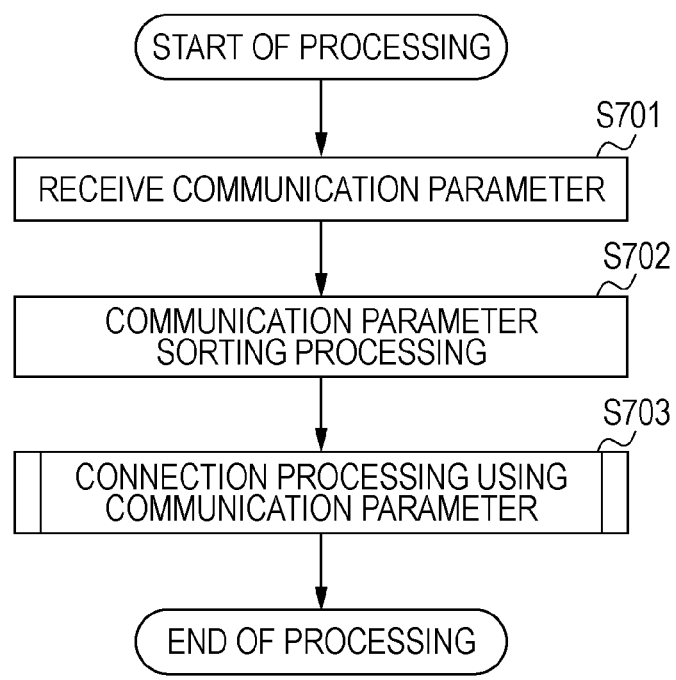
FIG. 7 is a flowchart illustrating an operation of the communication apparatus according to a second exemplary embodiment.

FIG. 7 is a flowchart illustrating an operation of a controller 202 performed when the communication apparatus 103 obtains a plurality of communication-parameter sets from the base station 102 by the communication-parameter automatic setting, according to the second exemplary embodiment.

In step S701, in accordance with an instruction issued by the controller 202, a communication-parameter receiving unit 307 receives a plurality of communication-parameter sets. In this exemplary embodiment, four communication-parameter sets are obtained as shown in FIG. 8A.

In step S702, in accordance with an instruction issued by the controller 202, an automatic-setting controller 308 performs processing for sorting the communication-parameter sets on the basis of certain items included in the communication-parameter sets. In this exemplary embodiment, the automatic-setting controller 308 performs the sorting processing in accordance with priority levels of the communication-parameter sets. An example of the sorting processing will be described with reference to FIGS. 8A and 8B. As shown in FIG. 8A, the communication apparatus 103 obtains the following four communication-parameter sets: a first communication-parameter set having a network identifier "WLAN", an authentication method "WPA-PSK", and an encryption method "TKIP", a second communication-parameter set having a network identifier "WLAN", an authentication method "WPA2-PSK", and an encryption method "AES", a third communication-parameter set having a network identifier "WLAN", an authentication method "OPEN", and an encryption method "NONE (no encryption)", a fourth communication-parameter set having a network identifier "WLAN", an authentication method "OPEN", and an encryption method "WEP". In a case where the communication-parameter sets are obtained in this order as described above, in accordance with an instruction issued by the controller 202, the automatic-setting controller 308 refers to a storage unit 203 and sorts the communication-parameter sets in accordance with the priority levels. In this exemplary embodiment, the communication-parameter sets are sorted in accordance with security levels of the encryption methods serving as the priority levels in descending order of security level. Ranking of the security levels is stored in the storage unit 203 as shown in FIG. 9A. Accordingly, the communication-parameter sets are sorted in the following order: a first communication-parameter set having a network identifier "WLAN", an authentication method "WPA2-PSK", and an encryption method "AES", a second communication-parameter set having a network identifier "WLAN", an authentication method "WPA-PSK", and an encryption method "TKIP", a third communication-parameter set having a network identifier "WLAN", an authentication method "OPEN", and an encryption method "WEP", a fourth communication-parameter set having a network identifier "WLAN", an authentication method "OPEN", and an encryption method "NONE".

Note that if communication-parameter sets having the same security levels are included, the ranking may be set so that the longer an encryption key length is, the higher the ranking is, or the ranking may be set in order of obtainment.

After the sorting processing, the controller 202 performs connection processing using the communication-parameter sets in step S703. This connection processing is the same as that described in the first exemplary embodiment with reference to the flowchart of FIG. 6, and a description thereof is omitted. Note that since the plurality of communication-parameter sets have already been received, step S601 is skipped, that is, the processing starts with step S602.

In this exemplary embodiment, the method for sorting the communication-parameter sets in descending order of security level is employed while the security levels are used as the priority levels. However, the communication-parameter sets may be sorted in ascending order of security level. In this case, after connection is successfully established using one of the communication-parameter sets, the communication-parameter set used when the connection was successfully established is compared with the a communication-parameter set which is last listed. When the two communication-parameter sets are different from each other, the communication-parameter set which is last listed is used for connection.

Furthermore, the sorting processing may be performed in accordance with communication standards (for example, IEEE802.11g or IEEE802.11n) serving as priority levels. Specifically, the sorting processing is performed using a table stored in the storage unit 203 shown in FIG. 9B. In this way, setting which attains high communication speed is selected irrespective of an order of the communication-parameter sets supplied from the base station 102.

According to the second exemplary embodiment, since the communication-parameter sets are sorted in accordance with the priority levels before the connection processing using the communication-parameter sets is performed, setting which attains a high communication speed is selected irrespective of an order of the communication-parameter sets supplied from the base station 102. Accordingly, even in a case where a base station other than the base station 102 which assigns the highest security level to the first communication-parameter set and transmits the first communication-parameter set is used, connection is established using the communication-parameter set having a high security level.

A third exemplary embodiment of the present invention will now be described with reference to the accompanying drawings. Note that configurations of a wireless network 101, a base station 102, and a communication apparatus 103 of the third exemplary embodiment are the same as those of the first exemplary embodiment described with reference to FIGS. 1 to 3, and therefore, descriptions thereof are omitted.

In this exemplary embodiment, as with the first exemplary embodiment, a case where the communication apparatus 103 is connected to the wireless network 101 constituted by the base station 102, and performs communication-parameter automatic setting will be described.

Figure 10:
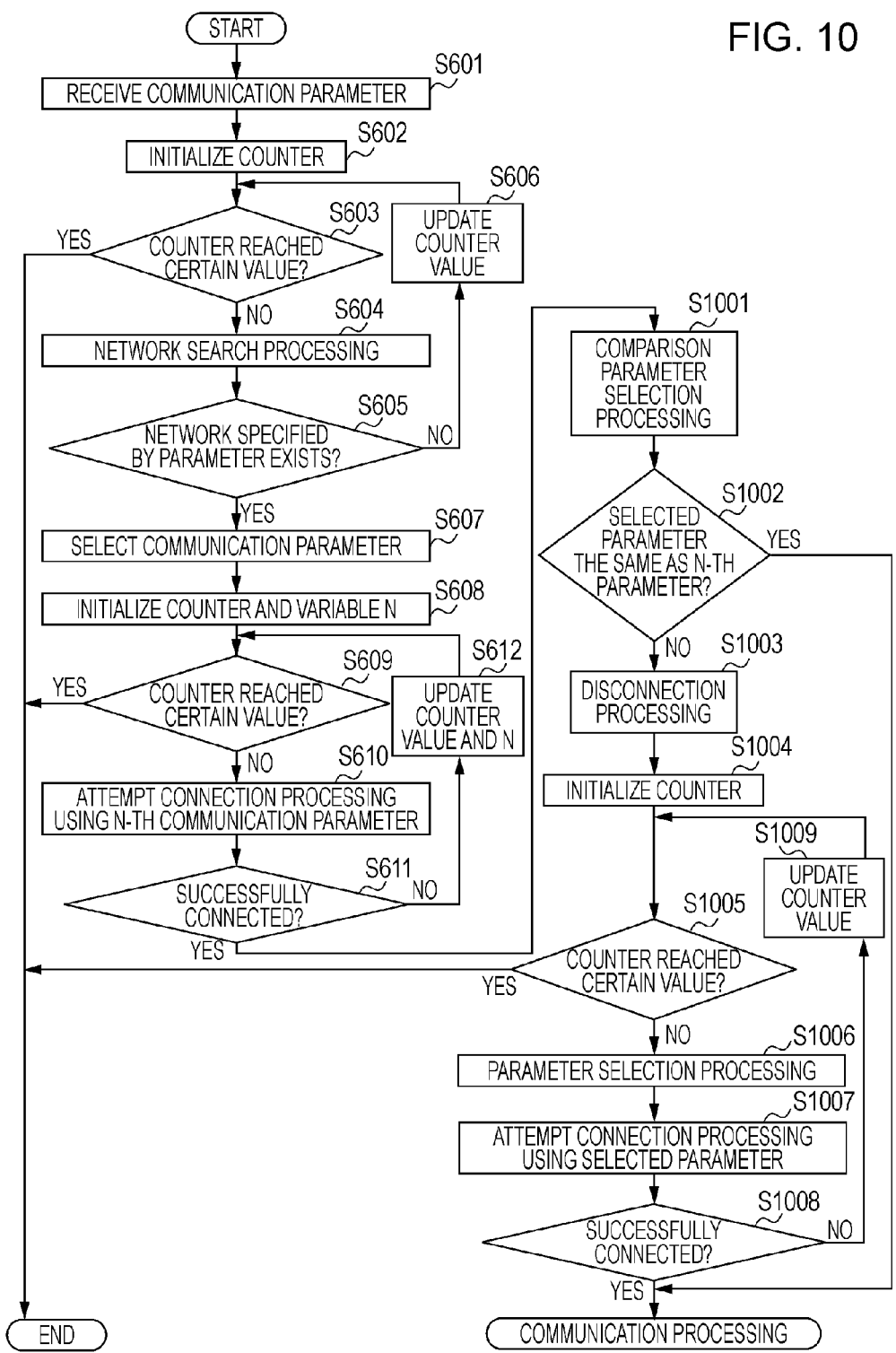
FIG. 10 is a flowchart illustrating an operation performed by a communication apparatus according to a third exemplary embodiment.

A control operation of the communication apparatus 103 performed when the communication apparatus 103 obtains a plurality of communication-parameter sets from the base station 102 using the communication-parameter automatic setting according to the third exemplary embodiment will be described with reference to FIG. 10. FIG. 10 is a flowchart illustrating the operation performed when a controller 202 executes a control program stored in a storage unit 203. In this exemplary embodiment, it is assumed that communication-parameter sets shown in FIG. 8A are obtained. Note that steps the same as those of the first exemplary embodiment are denoted by reference numerals the same as those of the first exemplary embodiment, and therefore, descriptions thereof are omitted.

In step S611, when a network controller 306 determined that connection to the base station 102 is successfully established using the N-th communication-parameter set, the process proceeds to step S1001. When it is determined that the connection is successfully established, the communication apparatus 103 recognizes that the base station 102 has completed rebooting and is in a connection-available state.

In step S1001, in accordance with an instruction issued by the controller 202, a communication-parameter selection unit 310 performs processing for selecting one of the communication-parameter sets, which is referred to as comparison-parameter selection processing. In this processing, one of the communication-parameter sets is selected in accordance with a predetermined criterion. In this exemplary embodiment, one of the communication-parameter sets is selected in accordance with priority levels. This selection processing may be performed in accordance with security levels serving as the priority levels. In this case, a communication-parameter set, among the communication-parameter sets, which has a highest security level may be selected. Alternatively, communication standards are used as the security levels. In this case, one of the communication-parameter sets which complies with a certain communication standard which is compatible with the communication apparatus 103 may be selected. Furthermore, communication speeds may be used as the priority levels. In this case, one of the communication-parameter sets which has a high communication speed may be selected. Moreover, one of the communication-parameter sets which has a high security level, which complies with a certain communication standard which is compatible with the communication apparatus 103, and which attains a high communication speed may be selected. These criteria are merely examples, and other criteria may be used. In this exemplary embodiment, the communication-parameter selection unit 310 refers to security levels stored in a storage unit 203, and select a second communication-parameter set which has the highest security level.

In step S1002, in accordance with an instruction issued by the controller 202, the communication-parameter selection unit 310 compares the communication-parameter set selected in step S1001 (the second communication-parameter set, here) with the N-th communication-parameter set used when the connection was established in step S610. Then, in accordance with an instruction issued by the controller 202, the communication-parameter selection unit 310 determines whether the two communication-parameter sets are identical to each other. Specifically, the communication-parameter selection unit 310 determines whether a variable N is equal to 2. When the determination is affirmative, the communication apparatus 103 and the base station 102 perform normal communication using the communication-parameter set having the highest security level.

On the other hand, when the determination is negative in step S1002, the process proceeds to step S1003 where disconnection processing is performed.

In step S1004, the controller 202 initializes a value set in a counter unit 311. In step S1005, the controller 202 determines whether the value set in the counter unit 311 has reached a certain value (15 in this exemplary embodiment). When the determination is affirmative in step S1005, the process is terminated. On the other hand, when the determination is negative in step S1005, the process proceeds to step S1006.

In step S1006, in accordance with an instruction issued by the controller 202, the communication-parameter selection unit 310 performs parameter selection processing. In this processing, one of the communication-parameter sets is selected in accordance with a predetermined criterion. An initial value of the criterion is the same as that used in step S1001. In the second time onward, each time one of the communication-parameter sets is selected, a value of a counter representing the number of times the communication-parameter set of interest is selected is incremented. Then, a communication-parameter set corresponding to a large value of the counter is excepted from the comparison. In this way, each of the communication-parameter sets is prevented from being successively selected. Therefore, when connection using a communication-parameter set having the highest security level failed, a communication-parameter set having the second highest security level is selected in the next selection processing.

Note that the N-th communication-parameter set which was used when the network controller 306 determined (in step S611) that the connection to the base station 102 is successfully established may be selected. By this, communication which attains a high security level is attempted, and even when the attempt failed, a period of time required before communication processing is performed is reduced. Accordingly, user operability is improved.

In step S1007, in accordance with an instruction issued by the controller 202, the network controller 306 attempts connection to the base station 102 using the communication-parameter set selected in step S1006.

In step S1008, in accordance with an instruction issued by the controller 202, the network controller 306 determines whether the connection performed in step S1007 is successfully established. When the determination is negative in step S1008, the process proceeds to step S1009. In step S1009, the controller 202 increments the value set in the counter unit 311 by one, and the process returns to step S1005. On the other hand, when the determination is affirmative in step S1008, the communication apparatus 103 and the base station 102 are brought into data-communication available states.

According to the third exemplary embodiment, since the connection is established by selecting one of the communication-parameter sets in descending order of priority level, the connection is established using a communication-parameter set which is suitable for the connection and which has a higher priority level.

In the foregoing exemplary embodiments, the wireless LAN complying with IEEE802.11 standard is taken as an example. However, the present invention is applicable to other wireless media such as a wireless USB, MBOA (Multi Band OFDM Alliance), Bluetooth (registered trademark), UWB (Ultra Wide Band), and ZigBee. Furthermore, the present invention is applicable to wired communication media such as a wired LAN. The UWB includes a wireless USB, wireless 1394, and WINET (WiMedia Network).

Furthermore, although the network identifier, the encryption method, the encryption key, the authentication method, and the authentication key are taken as examples of the communication parameters, other information may be used as a communication parameter, or other information may be included in the communication parameters.

According to the first to third exemplary embodiments, the base station 102 serving as the communication-parameter supplying apparatus supplies the communication-parameter sets to the communication apparatus 103 through wireless communication connection. However, the supplying method is not limited to this, and other methods may be used. For example, the base station 102 serving as the communication-parameter supplying apparatus may supply the communication-parameter sets to the communication apparatus 103 via a USB (Universal Serial Bus) or a non-contact memory card.

In each of the first to third exemplary embodiments, the base station 102 constructs the network employing the dedicated SSID used for the communication-parameter automatic setting in accordance with an instruction issued by a user's operation or an instruction issued by the control software application which controls the base station 102. However, some base stations do not construct networks employing dedicated SSIDs used for the communication-parameter automatic setting. Even in such a base station, if an upper layer and a lower layer are rebooted in order to switch a mode used when the communication-parameter sets are supplied to a mode used when normal communication is performed, the base station rejects a connection request. Even when each of the communication apparatuses 103 according to the first to third exemplary embodiments is to be connected to such a base station which performs such rebooting, advantages similar to those of the first to third exemplary embodiments may be obtained.

As described above, in the first to third exemplary embodiments, the communication apparatus 103 obtains a plurality of communication-parameter sets, and transmits a connection request to the other apparatus while switching the communication-parameter sets from one to another. As a result of the request, it is determined whether the communication apparatus 103 is connected to the other communication apparatus. When the determination is affirmative, connection to the other communication apparatus is requested again using a communication-parameter set which is used when connection failed. Specifically, after connection using a first communication-parameter set fails and connection using a second communication-parameter set is successfully established, the connection using the first communication-parameter set is requested again.

Figure 11:
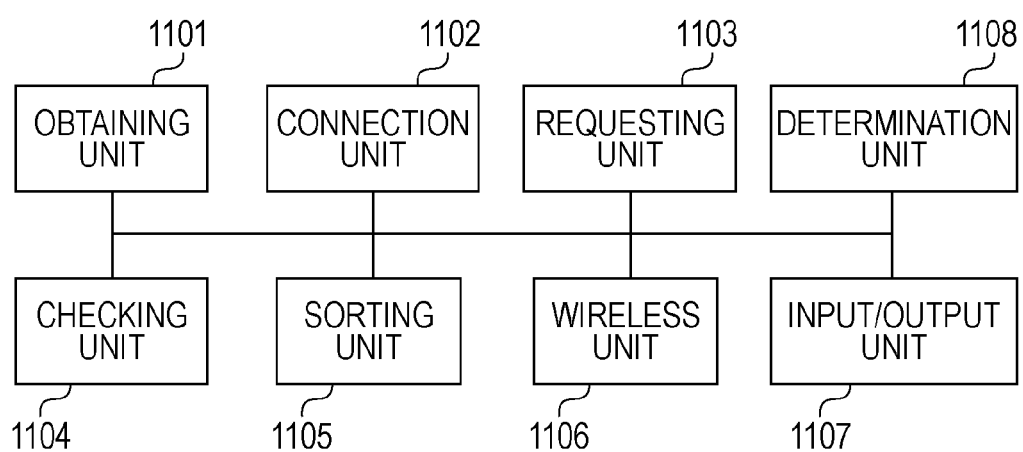
FIG. 11 is a block diagram illustrating a configuration of a communication apparatus.

FIG. 11 is a functional block diagram illustrating a configuration of such a communication apparatus 103.

The communication apparatus 103 includes an obtaining unit 1101, a connection unit 1102, and a requesting unit 1103. The obtaining unit 1101 obtains a plurality of communication-parameter sets. The connection unit 1102 connects the communication apparatus 103 to another communication apparatus using the communication-parameter sets. The requesting unit 1103 transmits, after the connection between the communication apparatus 103 and the base station 102 is successfully established using a communication-parameter set, a connection request to the communication apparatus 103 using another communication-parameter set selected in accordance with a priority level of the communication-parameter set used when the connection was established. The communication apparatus 103 further includes a checking unit 1104, a sorting unit 1105, a wireless unit 1106, and an input/output unit 1107. The checking unit 1104 checks identifiers of networks in ambient environment. The sorting unit 1105 sorts the communication-parameter sets in accordance with the priority levels. The wireless unit 1106 is used to perform wireless communication with the base station 102. The input/output unit 1107 inputs and outputs images. For example, the communication apparatus 103 may function as an image inputting apparatus such as a digital still camera. In this case, the input/output unit 1107 functions as an input unit which captures images. When a user instructs execution of network connection processing, the wireless unit 1106 transmits images captured by the input unit 1107 through wireless communication using a communication-parameter set having a high priority level to the base station 102. The communication apparatus 103 may function as an image-output unit. In the case where the communication apparatus 103 functions as the output unit, when the user operates the connection button 206 so as to instruct execution of the network connection processing, the output unit prints or displays an image supplied from the base station 102 via the wireless unit 106.

The communication apparatus 103 further includes a determination unit 1108 which determines whether connection to another communication apparatus is successfully established.

As described above, even when the communication apparatus 103 functions as an image processing apparatus such as a digital still camera or a printer, communication using a communication-parameter set having a high priority level is achieved. That is, it is possible that an operation unit in the image processing apparatus serving as a digital still camera or a printer is not suitable to setting of the communication-parameter set. Even with this image processing apparatus, communication using a communication-parameter set having a high priority level is attained. For example, if priority levels are set so that the higher a security level of the communication-parameter set is, the higher the priority level is, even when a captured image or an image to be printed which require high security levels are to be transmitted, communication having a high security level is attained without complicated operations performed by the user. Accordingly, for example, when the communication apparatus 103 functions as a printer, an image which requires a high security level, such as secure print, is printed using communication having a high security level. Accordingly, user operability is improved. Furthermore, when the communication apparatus 103 functions as a digital still camera, a captured image is transmitted in a secure environment. When the highest priority level is assigned to a communication-parameter set which attains a highest communication speed, a captured image or an image to be printed having a large amount of information can be transmitted and received at high speed without complicated operations performed by the user. Accordingly, when the communication apparatus 103 functions as a printer, a period of time required for receiving an image having a high resolution, that is, an image having a large amount of data, can be reduced, and deterioration of a printing speed caused by a low transmission speed is prevented. Furthermore, when the communication apparatus 103 functions as a digital still camera, a captured image having a high resolution can be transmitted to another communication apparatus within a short period of time, and images can be transmitted while continuous shooting is performed. Accordingly, a shooting-disable state caused by a low transmission speed is prevented. Specifically, since a memory is quickly cleared by deleting an image which has been transmitted, a shooting-disable state caused by memory full is prevented.

As described above, the communication apparatus 103 is once connected to the base station 102, and attempts connection again using a communication-parameter set having a high priority level after the communication apparatus 103 recognizes that the base station 102 has completed rebooting and is in a connection-available state. When the attempt is successfully performed, the communication using the communication-parameter set having the high priority level can be performed. Even when the attempt fails, communication is performed using a communication-parameter set which was used when connection was successfully established, and therefore, connectivity is ensured. Furthermore, since the connection processing is performed using the communication-parameter set which was used when connection was successfully established, a period of time required before the communication processing is performed can be reduced, and user operability is improved.

Moreover, since the sorting processing is performed in accordance with the priority levels of the communication-parameter sets, irrespective of an order of the communication-parameter sets supplied from the base station 102, a communication-parameter set which has a high security level and which attains a high communication speed can be selectively set.

Furthermore, the communication apparatus 103 is once connected to the base station 102, and attempts connection again by selecting one of the communication-parameter sets in order of priority level after the communication apparatus 103 recognizes that the base station 102 has completed rebooting and is in a connection-available state. Accordingly, connection is established using a communication-parameter set which has a high security level and which attains a high communication speed while the connection-available state is ensured.

In the present invention, a storage medium which stores program code of software which attains the functions described above may be supplied to a system or an apparatus so that a computer (a CPU or an MPU) included in the system or the apparatus reads and executes the program code stored in the storage medium. In this case, the program code read from the storage medium attains the functions of the foregoing exemplary embodiments, and the storage medium which stores the program code is included in the present invention.

Examples of the storage medium used to supply the program code include a flexible disk, a hard disk, an optical disc, a magneto-optical disc, a CD-ROM (Compact Disc Read Only Memory), a CD-R (Compact Disc Readable), a magnetic tape, a nonvolatile memory card, a ROM (Read Only Memory), and a DVD (Digital Versatile Disc).

In addition to the realization of the functions described above by executing the program code read by the computer, the functions described above may be realized when an OS (Operating System) which operates in the computer performs part of or entire processing in accordance with the program code.

Furthermore, the program code read from the storage medium may be written to a memory included in a function expansion board inserted into the computer or a memory included in a function expansion unit connected to the computer. Then, in accordance with an instruction of the program code, a CPU included in the function expansion board or the function expansion unit may perform part of or entire processing so that the functions described above are realized.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-197965 filed Jul. 31, 2008, which is hereby incorporated by reference herein in its entirety.

What is claimed is:

1. A communication apparatus comprising:
a receiver configured to receive a plurality of communication parameter sets, which comprise a first communication parameter set including information on a first encryption key to encrypt communication with another communication apparatus and a second communication parameter set including information on a second encryption key to encrypt communication with said another communication apparatus, the first communication parameter set being different from the second communication parameter set, from said another communication apparatus;
a requestor configured
to request said another communication apparatus to establish first direct connection using the first communication parameter set for encrypted communication with said another communication apparatus using the first encryption key, and
to request said another communication apparatus to establish second direct connection using the second communication parameter set for encrypted communication with said another communication apparatus using the second encryption key,
wherein, the requestor requests said another communication apparatus to establish the second direct connection in response to failure to establish the first direct connection according to a request to establish the first direct connection and re-requests said another communication apparatus to establish the first direct connection in response to success in establishing the second direct connection,
wherein the requestor re-requests said another communication apparatus to establish the second direct connection using the second communication parameter set for encrypted communication with said another communication apparatus using the second encryption key in response to failure to establish the first direct connection according to a re-request to establish the first direct connection; and
at least one processor configured to control at least one of the receiver, and the requestor.

2. The communication apparatus according to claim 1, wherein the first communication parameter set has a priority level higher than that of the second communication parameter set.

3. The communication apparatus according to claim 2, wherein priority levels are assigned to the plurality of communication parameter sets in order of reception.

4. The communication apparatus according to claim 2, wherein the priority levels are based on security level or communication speed.

5. The communication apparatus according to claim 2, wherein the requestor maintains the connection using the communication-parameter set in a case where there is no communication-parameter set having a priority higher than the first communication-parameter set.

6. The communication apparatus according to claim 1, wherein the communication parameter sets include one or more parameters selected from the group consisting of: network identifier, encryption method, authentication method and authentication key.

7. The communication apparatus according claim 1, wherein the requestor transmits a plurality of connection requests to said other communication apparatus using the received plurality of communication parameter sets one by one until a successful connection is established.

8. The communication apparatus according to claim 1, wherein the received communication-parameter sets include a network identifier and the apparatus further comprises a searcher configured to search for a network, and
wherein the requestor transmits a connection request to said other apparatus using a communication-parameter set having a network identifier corresponding to the found network.

9. The communication apparatus according to claim 1, further comprising:
a sorter configured to sort the plurality of communication-parameter sets in accordance with priority levels,
wherein the requestor transmits a plurality of connection requests to said other communication apparatus using the communication-parameter sets in the order sorted by the sorter until a successful connection is established.

10. The communication apparatus according to claim 1, further comprising:
an output device adapted to output an image received through the connection,
wherein the communication apparatus functions as an image-output apparatus.

11. The communication apparatus according to claim 1, further comprising:
an input device adapted to input an image; and
a transmitted adapted to transmit an image input by the input device through the connection,
wherein the communication apparatus functions as an image-input apparatus.

12. A communication apparatus according to claim 1, further comprising
a notification unit configured to notify of a disconnection to the other communication apparatus before the re-requesting.

13. A non-transitory recording medium which stores a program which makes a computer function as the communication apparatus set forth in claim 1.

14. The communication apparatus according to claim 1, wherein a security level of the second communication parameter set is higher than a security level of the first communication parameter set.

15. The communication apparatus according to claim 14, wherein, in a case where direct connection to said another communication apparatus using the first communication parameter set which said another communication apparatus is requested to establish succeeds after the receiver receives the first and second communication parameter sets from said another communication apparatus, communication using the first communication parameter set is performed.

16. The communication apparatus according to claim 1, wherein said another communication apparatus is a provider for providing the first and second communication parameter sets.

17. The communication apparatus according to claim 1, wherein the receiver receives the first and second communication parameter sets transmitted from said another communication apparatus according to a request for acquiring a communication parameter set from said another communication apparatus.

18. The communication apparatus according to claim 1, wherein said another communication apparatus is a base station that constructs a network.

19. The communication apparatus according to claim 1, wherein the receiver receives a plurality of communication-parameter sets comprising the first and second communication-parameter sets, the first communication-parameter set including at least one encryption parameter and the second communication-parameter set including a least one encryption parameter, from another communication apparatus.

20. The communication apparatus according to claim 1, further comprising:
a connector configured to connect the communication apparatus to said another communication apparatus using one of the first communication parameter set and the second communication parameter set received by the receiver.

21. A method for controlling a communication apparatus, comprising:
receiving a plurality of communication parameter sets, which comprise a first communication parameter set including information on a first encryption key to encrypt communication with another communication apparatus and a second communication parameter set including information on a second encryption key to encrypt communication with said another communication apparatus, the first communication parameter set being different from the second communication parameter set, from said another communication apparatus;

requesting said another communication apparatus to establish first direct connection using the first communication parameter set for encrypted communication with said another communication apparatus using the first encryption key;

requesting said another communication apparatus to establish second direct connection using the second communication parameter set for encrypted communication with said another communication apparatus using the second encryption key;

requesting said another communication apparatus to establish the second direct connection in response to failure to establish the first direct connection according to a request to establish the first direct connection and re-requesting said another communication apparatus to establish the first direct connection in response to success in establishing the second direct connection; and re-requesting said another communication apparatus to establish the second direct connection using the second communication parameter set for encrypted communication with said another communication apparatus using the second encryption key in response to failure to establish the first direct connection according to a re-request to establish the first direct connection.

* * * * *